Figure 1:
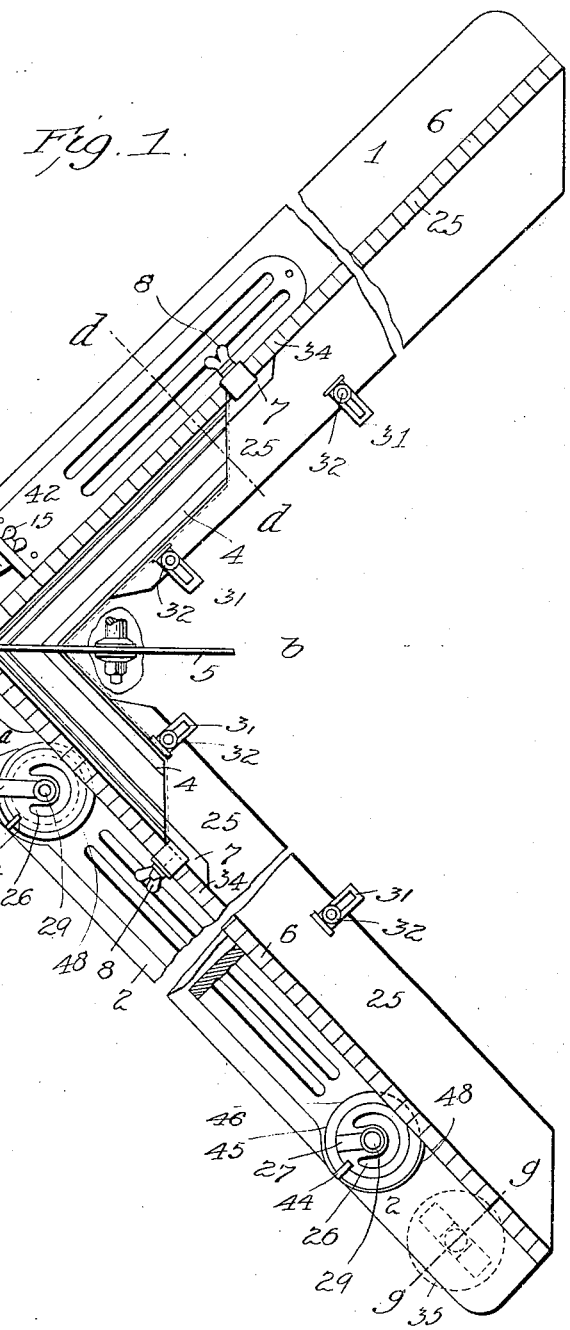

No. 778,642. PATENTED DEC. 27, 1904.
R. DUNNE.
METHOD OF CUTTING MATERIAL FOR FORMING MITER JOINTS.
APPLICATION FILED OCT. 26, 1903.

3 SHEETS—SHEET 1.

Attest:
C. S. Middleton
L. B. Middleton

Inventor:
Ralph Dunne
by Richards
Attys.

No. 778,642. PATENTED DEC. 27, 1904.
R. DUNNE.
METHOD OF CUTTING MATERIAL FOR FORMING MITER JOINTS.
APPLICATION FILED OCT. 26, 1903.
3 SHEETS—SHEET 2.
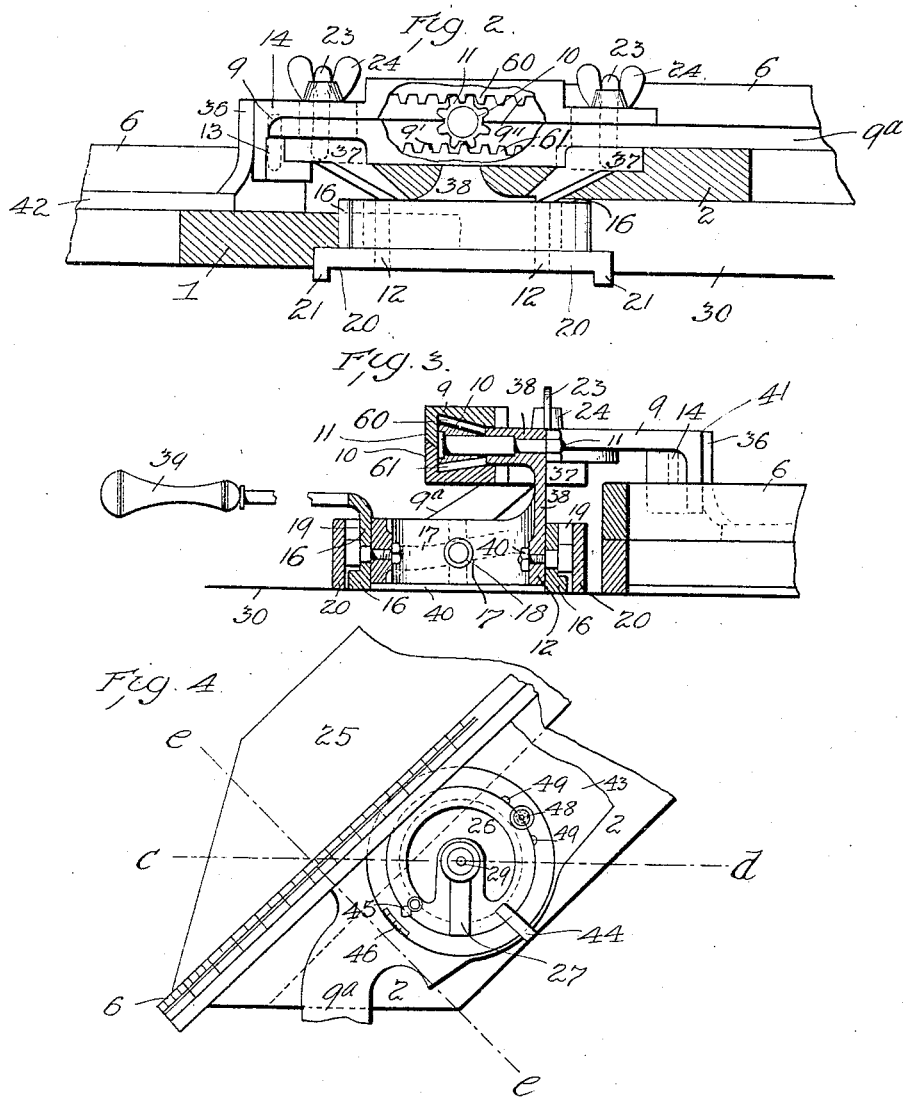

No. 778,642. PATENTED DEC. 27, 1904.
R. DUNNE.
METHOD OF CUTTING MATERIAL FOR FORMING MITER JOINTS.
APPLICATION FILED OCT. 26, 1903.
3 SHEETS—SHEET 3.
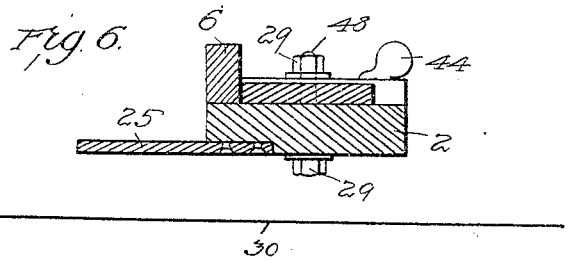
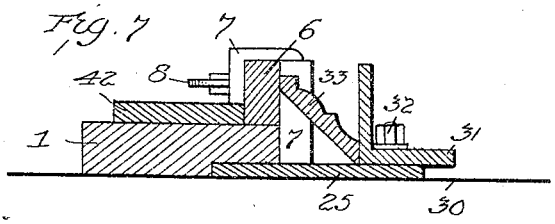
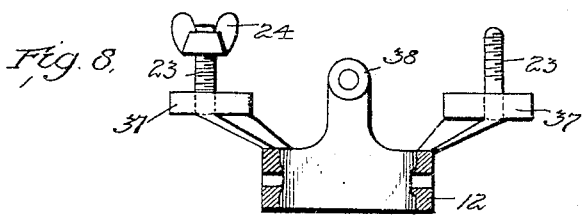
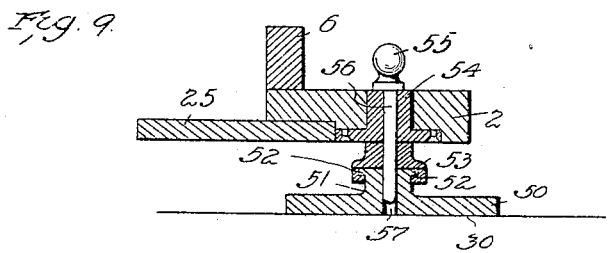
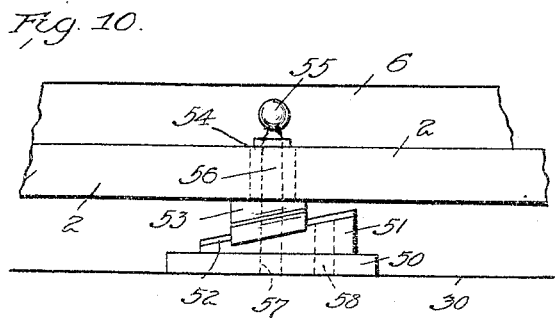

No. 778,642.
Patented December 27, 1904.

UNITED STATES PATENT OFFICE.

RALPH DUNNE, OF DUNEDIN, NEW ZEALAND.

METHOD OF CUTTING MATERIAL FOR FORMING MITER-JOINTS.

SPECIFICATION forming part of Letters Patent No. 778,642, dated December 27, 1904.

Application filed October 26, 1903. Serial No. 178,593.

*To all whom it may concern:*

Be it known that I, RALPH DUNNE, picture-framer, of George street, Dunedin, New Zealand, have invented a certain new and useful Improved Method of Cutting Material to Form Miter-Joints, of which the following is a specification.

This invention relates to an improved method of cutting material in order to form miter-joints when strips of the material are joined together at their cut ends. Heretofore material has been cut for the before-described purposes either in strips separately or in strips coinciding with one another, fitting of the cut ends being necessary; but by the method hereinafter described strips of material are held crossed and cut together, so as to fit each other exactly at their cut ends to form a miter-joint.

The method is as follows: There is a support for one strip of material having a supporting-surface to hold the strip in one plane, a second support for another strip having its supporting-surface at all times in a plane parallel to the first and with the second strip crossing the first, said supports being arranged at an angle to each other, and a cutter arranged to cut the moldings simultaneously at their point of crossing. The support for the second strip is also made adjustable, so as to alter its distance from the plane of the first support while maintaining its parallel relation thereto. One of the supports is also made adjustable toward and from the circular saw while maintaining its parallel relation to the other support, this adjustment being for the purpose of making the edge of a strip touch a circular saw at the same time as the corresponding edge of the other strip, so that the saw may commence to cut the strips simultaneously. The angular relation between the supports is altered when it is desired to cut the strips at different angles.

One form of machine which is adapted to carry out the described method is illustrated in the accompanying drawings, in which—

Figure 1 is a plan view of such machine. Fig. 2 is a front view of part of same. Fig. 3 is a sectional view from front to rear of part of same at $a\,b$, Fig. 1. Fig. 4 is a plan view of part of arm 2, showing details. Fig. 5 is a sectional view at $c\,d$, Fig. 4. Fig. 6 is a sectional view of arm 2 at $e\,e$, Fig. 4. Fig. 7 is a sectional view of arm 1 at $d\,d$, Fig. 1, showing a strip of molding held in place by stop 31. Fig. 8 is a sectional view of bracket 12 at $f\,f$, Fig. 1. Fig. 9 is a sectional view of arm 2 at $g\,g$, Fig. 1. Fig. 10 is a part elevation of Fig. 9.

In the drawings, 1 and 2 indicate arms having plates 25 and graduated bars 6 combined therewith, said plates and graduated bars forming rests upon which the moldings 4 4 to be cut are placed. These arms 1 and 2 are adapted to be adjusted in relation to each other to any desired angle, and for this purpose they are respectively combined, by means of the extensions 42 43, with segmental arms 9 $9^a$, the arm 9 resting upon the arm $9^a$, each of said arms having curved slots 22, through which bolts 23 pass, the bolts having clamping-nuts 24, by which the segments are clamped in any position to which they may be adjusted, as will be more fully described hereinafter. The extension 42 is secured to the arm 1 permanently. The extension 43 is adjustably secured to arm 2, as is hereinafter more particularly described. Gages 7 7 are employed, one for each arm, secured adjustably by clamping-nuts 8 graduated bars 6 on the arms. By sliding these gages along the graduated bars and securing them in the desired position any desired length of molding may be gaged up to the length of the arms 1 and 2. The gages shown in the drawings are adapted for the molding to be cut at an angle of forty-five degrees. For cutting the molding at any other angle these gages are removed and replaced, so that the one takes the place of the other, and then the end of the molding butts up against the apex 34 of the obtuse angle formed by the gages with the arms and graduated bars.

A circular saw is indicated at 5, its position showing that it has cut through the moldings.

The arms 1 and 2, as shown in Fig. 2, are in different horizontal planes, and the extension 42, secured to arm 1, has an upwardly-extending bracket 36, to which the segmental arm 9 is secured adjustably by a bolt or bolts 13, which pass from said segmental arm 9 through a slot 14 in the bracket 36, a clamping nut or nuts 15 (shown in Fig. 1) being employed to clamp the parts together firmly. This construction enables the segmental arm 9 to be adjusted vertically without moving the arm 1 off from the bench. The segmental arms 9 and 9ª are supported by a bracket 12, having arms 37 extending from the ring-shaped lower or main portion of bracket 12, upon the upper ends of which arms 37 37 the segmental arm 9ª rests. The segmental arms 9 and 9ª are clamped to the said bracket-arms 37 by means of the bolts 23 and nuts 24, said bolts being fixed to the bracket-arms 37 and extending up through the said slots 22. By this means the segmental arms 9 9ª may be held in any position to which they may be adjusted.

One of the arms, 38, of the bracket 12 extends vertically, as shown in Fig. 3, and this supports a spindle or shaft 11, extending in between the two segmental arms 9 9ª and having a beveled pinion 10 thereon meshing with segmental racks 9' 9'' on the segmental arms 9 and 9ª. By this means the adjustment of the segmental arms 9 9ª is rendered uniform.

The ring-shaped center of the bracket 12 fits within a ring-shaped base-plate 20. This base-plate 20 forms the base of the apparatus, which rests upon the bench 30. The base-plate 20 has two ribs 21, adapted to fit in grooves in the bench, cut parallel to the saw, so that the whole apparatus may be moved toward and from the saw to allow different widths of moldings to be cut.

The bracket 12, carrying segmental arm 9ª, arm 2, and part of segmental arm 9 as far as joint 41, is adjustable vertically by the cam-ring 16, having inclined slots 17, through which bolts 18 extend, the heads of which fit into vertical grooves or slots 19 in the outer or main base-ring 20. This cam-ring 16 works between the base-ring 20 and the ring-shaped lower or main portion of bracket 12. The bolts 18 are secured to the latter by the nuts 40. A handle 39 extends from the cam-ring 16, and by said handle the cam-ring 16 may be turned to thus raise or lower the bracket 12 for the purpose of raising arm 2 to enable the various sizes of molding to pass under arms 2 and also adjusting the whole apparatus in relation to the bench, excepting arm 1, which remains on the bench.

There is shown in Fig. 4 a part plan view of arm 2, segmental arm 9ª, extension 43, graduated bar 6, and the plate 25, which is checked in and secured to arm 2, as shown in Fig. 5 and in sectional view at $c\,d$, Fig. 4. There are two turned disks 26 at each end of extension 43. Each disk has a slot 27, to which is fitted a block 28, that is made a sliding fit in slot 27. Bolt 29 passes through block 28 and has a nut and washer on its upper side, which secures extension 43 of segmental arm 9ª to arm 2 when properly adjusted. The disks 26 are adapted to give arm 2 the forward parallel movement when at any angle to suit the various widths of moldings to be cut and to enable the edges of the upper and lower moldings to meet the saw simultaneously when a circular saw is used. The disks 26, with slots 27 adjusted as shown in Fig. 4, allow a forward parallel movement when the arms 1 and 2 are set at right angles to each other. When the arms 1 and 2 are set at any other angle required, the disks 26 are turned by the thumb-piece 44 until the indicator-hand 45 is pointing to the required angle registered on the graduated scale 46, cut on a raised piece 47 on extension 43 and round disk 26. The pin 48 is inserted in one of the holes 49 to prevent disks 26 from shifting while the arm 2 is being properly adjusted.

Figs. 9 and 10 illustrate means for supporting the outer end of arm 2. The base 50 has an inclined-plane piece 51 cast upon it, with projecting pieces 52 to form guides for the upper part of pedestal 53, which is secured to arm 2 and has a projection-piece 54, which passes up through arm 2 till flush with the top of arm 2. The pin 55 passes through a hole 56 in the upper part of pedestal 53 and projection-piece 54 into corresponding hole 57 in inclined-plane piece 51 and base 50. Holes such as 57 and 58 in the inclined-plane piece 51 and base 50 are so pitched that when arm 2 is being adjusted by cam-ring 16, operating bracket 12, the upper part of the pedestal 53 will rise or fall in the same ratio and support the outer end of arm 2 at $g\,g$ in Fig. 1, parallel with the bench.

The sectional view shown in Fig. 5 and through $c\,d$ of Fig. 4 shows the relation to the bench 30 when arm 2 is elevated to half the distance adjustable by operating bracket 12, as shown in Figs. 2 and 3.

In Fig. 7 there is shown a portable stop 31, adapted to slide backward and forward on the plate 25 and secured by the countersunk bolt 32 after suitable adjustment for supporting molding of particular shape, such as illustrated at 33.

From the above it will be seen that the arms 1 and 2 have a connection between them in the nature of a pivotal one allowing them to be adjusted to different angular positions, that one of these arms may be adjusted vertically toward and from the bench, and that both arms may be moved together with the supporting-bracket toward and from the saw.

The arrangement of the parts shown in Figs. 4 and 5 is such that the uppermost piece of molding may be slid forward, so that its edge is cut by a circular saw simultaneously with the cutting of the edge of the lowermost piece of molding.

I do not limit myself to the form of saw, as a band-saw may be used; but when a band-saw is used working perpendicular to the bench the arrangement of parts mentioned in the last preceding sentence is not required, as the edges of the moldings may be set to meet such a saw simultaneously without such arrangement.

The device may be made with a metal base of its own adapted to fit and be mounted onto a saw-bench instead of being made, as shown in the drawings, with the top of the saw-bench used as the base.

From the above it will be seen that the two pieces are cut so as to fit each other exactly, for if the saw wabbles it will take off one strip what it leaves upon the other.

Having now described my invention, what I claim as new, and desire to secure by Letters Patent, is—

1. The herein-described improvement in the art of making miter-joints which consists in arranging two pieces to be miter-jointed together so as to cross each other at the angle which they are to present in the joint and passing a dividing-blade through them where they cross in the meeting line of the proposed joint whereby each piece in the joint will be the exact counterpart of the opposed piece of such joint, and then uniting such pieces to each other on the line of division, substantially as described.

2. The herein-described improvement in the art of making miter-joints which consists in arranging two pieces to be miter-jointed together in parallel planes and so as to cross each other at the angle which they are to present in the joint and passing a dividing-blade through them where they cross in the meeting line of the proposed joint whereby each piece in the joint will be the exact counterpart of the opposed piece of such joint, and then uniting such pieces to each other on the line of division, substantially as described.

In witness whereof I have hereunto set my hand in presence of two witnesses.

RALPH DUNNE.

Witnesses:
A. J. PARK,
J. K. PARK.